US011929600B2

(12) United States Patent
Voelzke

(10) Patent No.: US 11,929,600 B2
(45) Date of Patent: Mar. 12, 2024

(54) CONDUIT BODY FEATURES FOR USE IN THE FOOD PREPARATION INDUSTRY

(71) Applicant: Robroy Industries—Texas, LLC, Gilmer, TX (US)

(72) Inventor: Steven A. Voelzke, Longview, TX (US)

(73) Assignee: Robroy Industries—Texas, LLC, Gilmer, TX (US)

( * ) Notice: Subject to any disclaimer, the term of this patent is extended or adjusted under 35 U.S.C. 154(b) by 556 days.

(21) Appl. No.: 17/174,600

(22) Filed: Feb. 12, 2021

(65) Prior Publication Data

US 2021/0257820 A1 Aug. 19, 2021

Related U.S. Application Data

(60) Provisional application No. 62/976,713, filed on Feb. 14, 2020.

(51) Int. Cl.
*H02G 3/06* (2006.01)
*H02G 3/04* (2006.01)

(52) U.S. Cl.
CPC ............. *H02G 3/06* (2013.01); *H02G 3/0418* (2013.01)

(58) Field of Classification Search
CPC ......... F16L 45/00; H02G 3/086; H02G 3/088; H02G 3/08; H02G 9/02; H02G 3/14; F16J 15/064; Y10S 277/916
USPC ............. 138/92; 174/101, 481, 50; 439/207; 277/640, 916
See application file for complete search history.

(56) References Cited

U.S. PATENT DOCUMENTS

| 3,272,952 | A | * | 9/1966 | McKeon | ............... | H02B 1/042 |
| | | | | | | 174/138 D |
| 4,602,125 | A | * | 7/1986 | West | .................. | H01L 23/4006 |
| | | | | | | 361/767 |
| 4,867,461 | A | * | 9/1989 | Shimmell | ............. | F16J 15/064 |
| | | | | | | 277/916 |
| 5,621,189 | A | * | 4/1997 | Dodds | ................. | H02G 3/0418 |
| | | | | | | D13/152 |
| 5,693,909 | A | | 12/1997 | McEwen | | |
| 7,170,002 | B2 | | 1/2007 | Thompson | | |
| 7,427,714 | B1 | * | 9/2008 | Lammens, Jr. | .......... | H02G 9/02 |
| | | | | | | 174/67 |
| 7,504,580 | B2 | | 3/2009 | Lammens, Jr. et al. | | |
| 8,096,325 | B2 | | 1/2012 | Pyron | | |
| 8,129,631 | B1 | | 3/2012 | Shemtov | | |

(Continued)

OTHER PUBLICATIONS

Examination Report issued in EP21156488.5 dated Jun. 12, 2023.

*Primary Examiner* — Patrick F Brinson

(74) *Attorney, Agent, or Firm* — The Webb Law Firm

(57) ABSTRACT

A joint fitting for an electrical conduit raceway includes a body having an open side and defining a central passageway therein; a lid configured to be disposed on the body to close the open side of the body; at least one fastener configured to connect the lid to the body; and a gasket disposed between the lid and the body, the gasket being configured to seal a connection between the lid and the body. The lid includes at least one aperture formed therein for receiving the at least one fastener therein to allow the fastener to extend through the lid and the gasket comprises at least one cylindrical projection configured to extend into the aperture in the lid and receive the at least one fastener therein to retain the at least one fastener to the lid.

18 Claims, 3 Drawing Sheets

(56) References Cited

U.S. PATENT DOCUMENTS

| | | |
|---|---|---|
| 9,071,044 B2 | 6/2015 | Seidel et al. |
| 2006/0207783 A1* | 9/2006 | Lammens, Jr. ........ H02G 15/08 |
| | | 174/58 |
| 2007/0289765 A1 | 12/2007 | Lammens, Jr. et al. |
| 2008/0179877 A1 | 7/2008 | Pyron |
| 2009/0194310 A1* | 8/2009 | Pyron .................. H02G 3/0608 |
| | | 174/50 |
| 2009/0255703 A1 | 10/2009 | Vigorito et al. |
| 2010/0006170 A1* | 1/2010 | Pyron ...................... H02G 3/14 |
| | | 138/89 |
| 2016/0126710 A1* | 5/2016 | McEwen ................ H02G 3/086 |
| | | 174/50 |
| 2020/0194979 A1 | 6/2020 | Kessel et al. |

\* cited by examiner

CONDUIT BODY FEATURES FOR USE IN THE FOOD PREPARATION INDUSTRY

CROSS-REFERENCE TO RELATED APPLICATIONS

The present application claims priority to U.S. Provisional Patent Application No. 62/976,713, filed on Feb. 14, 2020 and entitled "Conduit Body Features for Use in the Food Preparation Industry", the disclosure of which is hereby incorporated in its entirety by reference.

BACKGROUND OF THE INVENTION

Field of the Invention

The present disclosure is generally directed to electrical conduit systems and, more particularly, to a joint fitting for electrical conduit systems with hygienic sealing arrangements.

DESCRIPTION OF RELATED ART

Conduit is a well-known protective covering and routing path for use with electrical wire and cable in both industrial, commercial, and residential applications. Electrical installments utilizing conduit typically include lengths of conduit connected by various types of fittings. Conduit is offered in a variety of metal, plastic, and composite materials, and is selected based on the needs of a particular application. Additionally, a multitude of governing bodies promulgate regulations requiring that conduit used in specific applications meets certain minimum requirements. For example, in certain applications, metal conduit and conduit fittings must maintain a minimum level of sterility to prevent corrosion, contamination and bacteria growth thereon.

In specific applications, conduit is used in the certain facilities to form "raceways" that hold electrical wire and cable that provide power, control, or data to certain machines and appliances in food and beverage processing, or pet food, or pharmaceutical operations, or similar facilities. Since the conduit may be placed in relatively close proximity or overhead to production equipment or tables on which products, food or beverages may be processed, prepared, or stored, regulations are in place that require the facilities to maintain a minimum level of sterility to avoid corrosion, contamination, and/or growth of bacteria thereon, which could transfer to any product for consumption or use being prepared or stored on adjacent surfaces. However, quite often conduit and conduit fittings will permit such corrosion, contamination, and/or bacteria growth to develop therein and/or on the surfaces thereof. Due to condensation or moisture ingress, and possible contact with the food and/or beverage, bacteria and/or contamination of the joint fitting between portions of the conduit often occurs. Water may seep into or out of the joint fitting between the conduit body of the joint fitting and the lid or between the connection portions of the conduit resulting in the growth or spread of bacteria. Water and dirt/dust may also accumulate on the exterior surfaces of the conduit body and the lid resulting in the growth of bacteria on the exterior of the joint fitting. Metal to metal contact between the conduit body, the lid, and the fasteners connecting the lid to the conduit body may result in contamination between metal parts. Further, loss during the installation process or due to vibration during use of the fasteners may result in the contamination of food preparation areas.

SUMMARY OF THE INVENTION

According to an example of the present disclosure, a joint fitting for an electrical conduit raceway is provided. The joint fitting comprises a body having at least one open side and defining a central passageway therein; at least one lid configured to be disposed on the body to close the at least one open side of the body; at least one fastener configured to connect the at least one lid to the body; and at least one gasket disposed between the at least one lid and the body, the gasket being configured to seal a connection between the lid and the body. The at least one lid comprises at least one aperture formed therein for receiving the at least one fastener therein to allow the fastener to extend through the lid and the at least one gasket comprises at least one cylindrical projection configured to extend into the aperture in the lid and receive the at least one fastener therein to retain the at least one fastener to the lid.

The body may define a rim surrounding the at least one open side and the gasket is configured to be seated on the rim over an entirety or a substantial entirety of the rim.

The at least one fastener configured to connect the lid to the body may comprise at least two fasteners, the lid may comprise at least two apertures formed therein for receiving the at least two fasteners to allow the fasteners to extend through the lid; and the gasket may comprise at least two cylindrical projections configured to extend into a respective one of the two apertures in the lid and receive a respective one of the at least two fasteners there to retain the respective fastener to the lid.

The at least one gasket may have a flat shape and at least one slot defined therein.

The body and the at least one lid may be formed from a stainless steel material. The at least one lid and the body may comprise exterior surfaces that are free or substantially free of edges, crevasses, and flat surfaces. The body may have a bowed configuration. The at least one lid may have a raised configuration.

The joint fitting may further comprise at least one sealing member disposed between the at least one fastener and the at least one lid. The at least one fastener may comprise at least one stop configured to optimize compression of the at least one sealing member.

According to another example of the present disclosure, a joint fitting for an electrical conduit raceway is provided. The joint fitting comprises: a body having at least one open side and defining a central passageway therein; at least one lid configured to be disposed on the body to close the at least one open side of the body; and at least one gasket disposed between the at least one lid and the body. The gasket is configured to seal a connection between the lid and the body. The at least one gasket has a flat shape and at least one slot defined therein to limit or eliminate contamination areas within the joint fitting.

The at least one lid may comprise at least one aperture formed therein for receiving at least one fastener therein to allow the fastener to extend through the lid and the at least one gasket may comprise at least one cylindrical projection configured to extend into the aperture in the lid and receive the at least one fastener therein to retain the at least one fastener to the lid. Alternatively, the joint fitting may comprise at least two fasteners configured to connect the lid to the body. The lid may comprise at least two apertures formed therein for receiving the at least two fasteners to allow the fasteners to extend through the lid; and the gasket may comprise at least two cylindrical projections configured to extend into a respective one of the two apertures in the lid and receive a respective one of the at least two fasteners there to retain the respective fastener to the lid.

The body may define a rim surrounding the at least one open side and the gasket is configured to be seated on the rim over an entirety or a substantial entirety of the rim.

The body and the at least one lid may be formed from a stainless steel material. The at least one lid and the body may comprise exterior surfaces that are free or substantially free of edges, crevasses, and flat surfaces. The body may have a bowed configuration. The at least one lid may have a raised configuration.

The joint fitting may further comprise at least one sealing member disposed between the at least one fastener and the at least one lid. The at least one fastener may comprise at least one stop configured to optimize compression of the at least one sealing member.

These and other features and characteristics of the present disclosure, as well as the methods of operation and functions of the related elements of structures and the combination of parts and economies of manufacture, will become more apparent upon consideration of the following description and with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and the claims, the singular form of "a", "an", and "the" include plural referents unless the context clearly dictates otherwise.

DETAILED DESCRIPTION OF THE INVENTION

Figure 1:
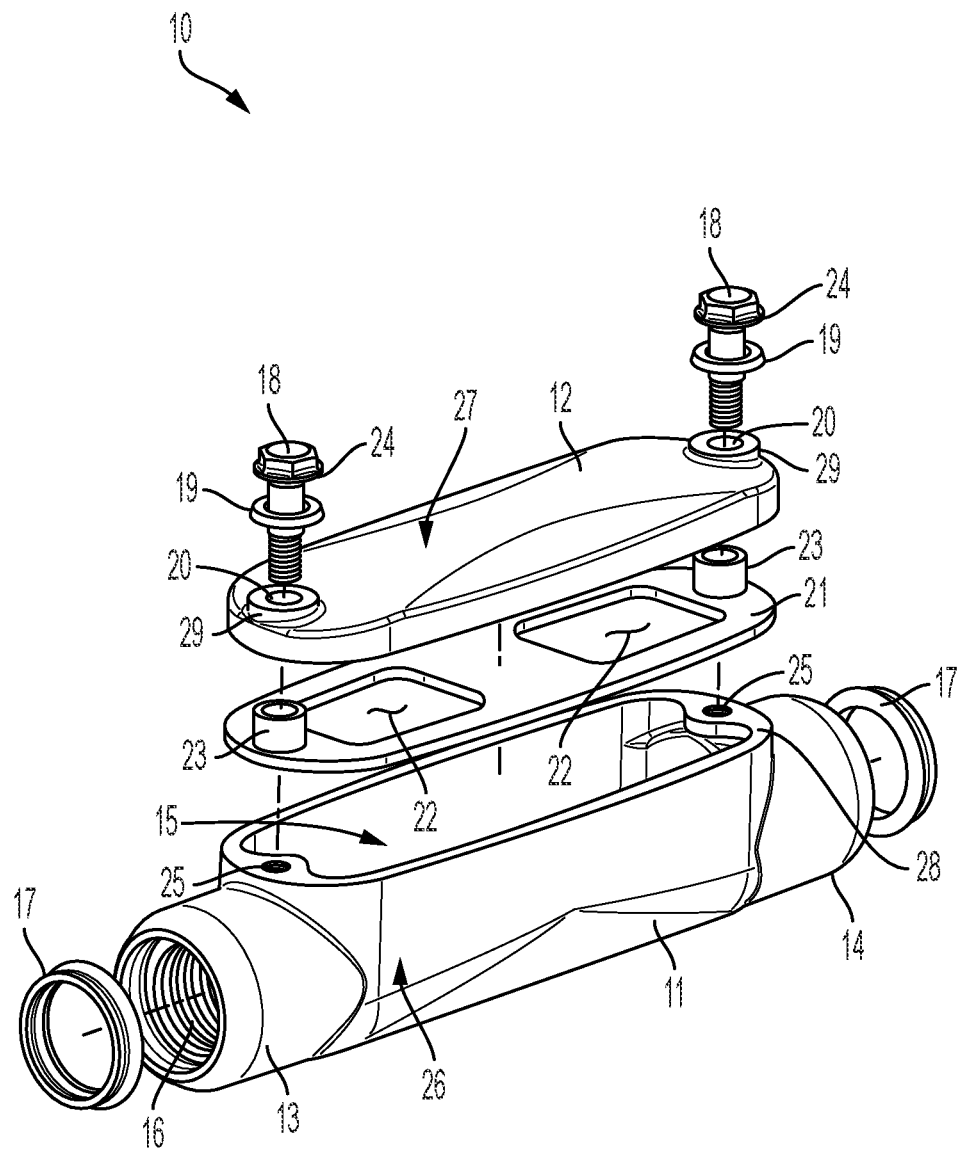
FIG. 1 is an upper perspective exploded view of a joint fitting, according to an example of the present disclosure.

For purposes of the description hereinafter, the terms "end", "upper", "lower", "right", "left", "vertical", "horizontal", "top", "bottom", "lateral", "longitudinal", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings and described in the following specification are simply exemplary embodiments or aspects of the invention. Hence, specific dimensions and other physical characteristics related to the embodiments or aspects disclosed herein are not to be considered as limiting.

Figure 2:
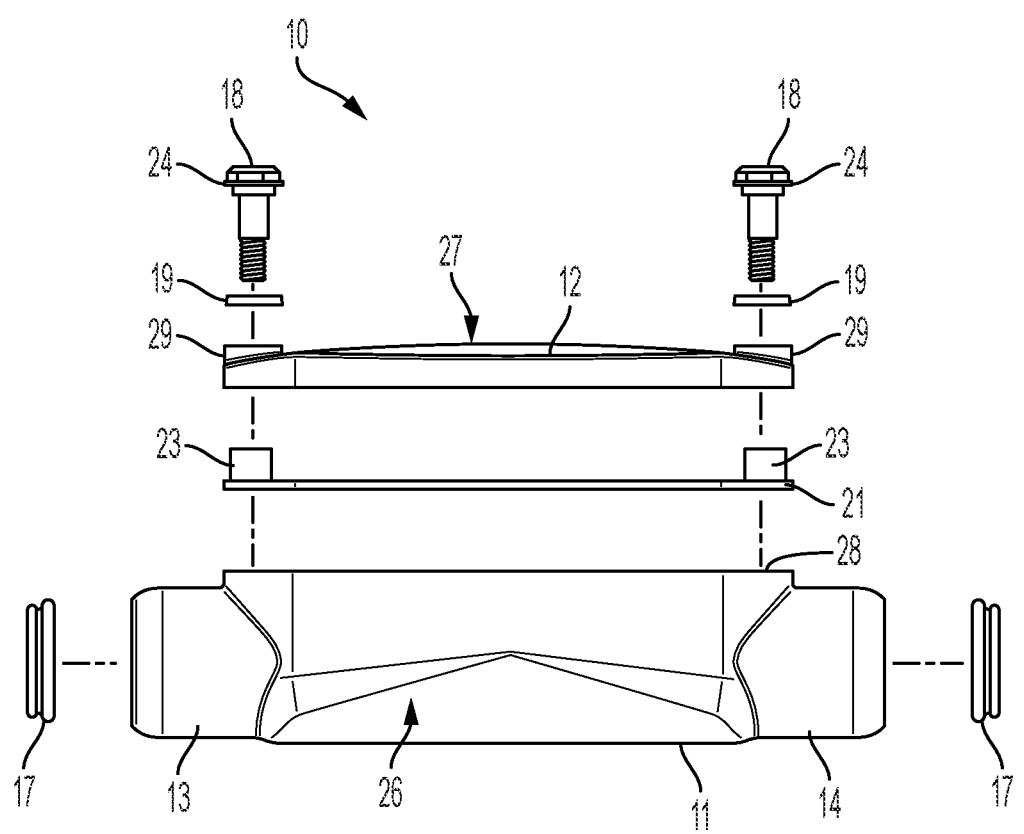
FIG. 2 is an exploded side view of the joint fitting of FIG. 1.
Figure 3:
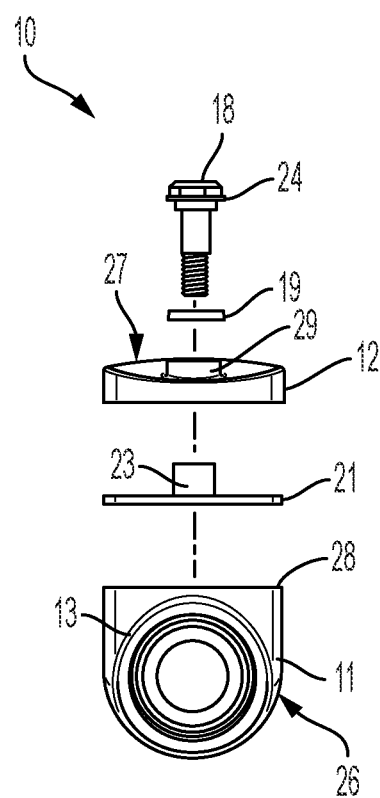
FIG. 3 is an exploded end view of the joint fitting of FIG. 1.

With reference to FIGS. 1-3, a joint fitting 10 (or conduit body) for an electrical conduit raceway, is shown in accordance with an example of the present disclosure. The joint fitting 10 includes a body 11 having an open top and defining a central passageway 15 therein. The central passageway 15 extends from a first end of the body 11 defined by a first body head 13 to a second end of the body 11 defined by a second body head 14. The joint fitting 10 also includes a lid 12 configured to be disposed on the body 11 to close the open top of the body 11. The open top of the body 11 allows for the central passageway 15 to be accessed so that electrical junctions may be assembled, connected or pulled through within the central passageway 15 and to provide for changes in direction to be formed in the conduit system, as is known to those having ordinary skill in the art.

The first body head 13 and the second body head 14 are configured to connect to electrical conduit in a manner well known to those having ordinary skill in the art to allow electrical wiring to extend through the central passageway 15. In particular, the first body head 13 and the second body head 14 each include a threaded portion 16 formed therein for allowing a threaded connection to be formed between the joint fitting 10 and conduit portions (not shown) extending from the joint fitting 10. A sealing gasket 17 may be disposed in the ends of each of the first body head 13 and the second body head 14 for sealing a connection between the first body head 13 and the second body head 14 and the respective conduit portions (not shown). According to one example of the present disclosure, the sealing gaskets 17 and the first body head 13 and the second body head 14 have the same configuration as the O-ring and ends disclosed in United States Patent Application Publication No. 2020/0194979, which is also assigned to Robroy Industries-Texas, LLC. United States Patent Application Publication No. 2020/0194979 is hereby incorporated by references as if set forth in its entirety herein.

As shown in FIGS. 1-3, the joint fitting 10 (or conduit body) has a straight configuration in which the first body head 13 and the second body head 14 are disposed on the joint fitting 10 opposite to each other such that electrical wiring is passed straight through the central passageway 15 from one end to the other. It is to be appreciated that the joint fitting 10 may be of any type or configuration known to be suitable to those having ordinary skill in the art. For instance, the joint fitting 10 may be configured to form a right, left, or downward bend, and/or may have a T, X, or LU shaped configuration.

With further reference to FIGS. 1-3, the body 11 defines a rim 28 that surrounds the open top of the body 11. At least one fastener 18 is provided to connect the lid 12 with the body 11 by extending through a respective aperture 20 formed in the lid 11 and engaging with a respective threaded bore 25 defined in the rim 28 of the body 11. More particularly, the lid 12 is connected to the body 11 by two or more fasteners 18 received in respective apertures 20 formed in the lid 12 for receiving a respective one of the fasteners 18 to allow the fasteners 18 to extend through the lid 12 and threadably engage respective threaded bores 25 in the rim 28 of the body. According to an example of the present disclosure, the fasteners 18, apertures 20, and threaded bores 25 are positioned on opposite sides of the central passageway 15. A sealing member 19 may be disposed between each of the fasteners 18 and the lid 12 in order to seal the engagement between the fasteners 18 and the lid 12 and prevent or limit the ingress of water and contaminants into the joint fitting 10 from between the fasteners 18 and the lid 12. According to an example of the present disclosure, the lid 12 includes bosses 29 that surround the apertures 20 and provide a seating surface for the sealing members 19. According to another example of the present disclosure, each of the fasteners 18 include stops 24 defined thereon that is configured to optimize compression and fit of the sealing member 19, as well as of the gasket 21. The stops 24 may be configured to optimize compression of the sealing members 19 and of the gasket 21 to achieve a targeted compression percentage thereby minimizing distortion of the sealing members 19 and of the gasket 21 and maximizing the seal provided by the sealing members 19 and by the gasket 21. According to another example of the present disclosure, the sealing members 19 and the gasket 21 are made from a FDA approved blue, non-food color, silicone having hygienic properties.

The joint fitting 10 also includes the gasket 21 disposed between the lid 12 and the body 11 to seal the connection between the lid 12 and the body 11 and prevent or limit the ingress of water or other contaminants into or out of the joint fitting 10 from between the lid 12 and the body 11. As shown, the gasket 21 is seated on the rim 28 of the body 11 and covers an entirety or a substantial entirety of the rim 28. Accordingly, when the lid 12 is connected to the body 11, the lid 12 is seated on and sealed against the rim 28 of the body 11 by the gasket 21. The gasket 21 may have a flat shape and at least one slot 22 defined therein to limit or eliminate contamination areas within the joint fitting 10.

The gasket 21 also includes cylindrical projections 23 that are each configured to extend into a respective one of the apertures 20 in the lid 12 and receive the respective one of the two fasteners 18 therein to retain the fastener 18 to the lid 12 within the aperture 20. In particular, the cylindrical projections 23 of the gasket 21 are configured to deform as the fasteners 18 are positioned within the projections 23 and engaged with the threaded bores 25 such that the fasteners 18 become retained within the cylindrical projections 23. Accordingly, in the event that the lid 12 is removed from the body 11, the loss of the fasteners 18 from the lid 12 can be prevented or limited, thereby avoiding the possibility of lost fasteners 18 contaminating the food preparation area.

It is also to be appreciated that the gasket 21 disposed between the lid 12 and the body 11, the sealing members 19 between the fasteners 18 and the lid 12, and the cylindrical projections 23 of the gasket 21 positioned between the fasteners 18 and the apertures 20 in the lid 12 prevent or limit metal to metal contact between the lid 12, the body 11, and the fasteners 18, to minimize possible contamination areas and to avoid or limit corrosion of the lid 12, the body 11, and the fasteners 18. The overall sealing of the joint fitting 10 also minimizes moisture condensation and allows for positive pressure to be applied within the conduit raceway system. Further, as discussed above, the mechanical protection provided by the gasket 21, the sealing members 19, and the cylindrical projections 23 create better protection against the ingress of water and other contaminants into the joint fitting 10. The threaded connection between the fasteners 18 and the threaded bores 25 in the rim 28 of the body 11 also contributes to the protection against the ingress of water and other contaminants into the joint fitting 10.

With reference to FIGS. 1-3, according to an example of the present disclosure, the body 11 and the lid 12 of the joint fitting 10 are formed from a stainless steel material in order to prevent the accumulation and buildup of water and contaminants on and in the joint fitting 10 and inhibit the growth of bacteria on and in the joint fitting 10. Additionally, the exterior surfaces 26 of the body 11 and the exterior surfaces 27 of the lid 12 are hygienic and formed to be free or substantially free of any edges, crevasses, and flat surfaces to prevent or limit the retention or accumulation of moisture, dirt/dust, and other contaminants on the surfaces of the joint fitting 10 to avoid bacterial growth and contamination of the food preparation area. According to an example of the present disclosure, the surfaces 26, 27 of the body 11 and the lid 12 are prepped to food safety standards for non-contact food preparation areas. Additionally, the fasteners 18 may be formed with a flat hex head configuration and without a slot in order to maximize hygiene and strength and to limit stripping. According to an example of the present disclosure, the body 11 has an outwardly bowed shape configuration and the lid has a raised shape configuration with respect to the body 11 in order to maximize the available space within the central passageway 15 to facilitate access to the central passageway 15 and wire pulling through the joint fitting 10.

It is to be understood that the invention may assume various alternative variations and step sequences, except where expressly specified to the contrary. It is also to be understood that the specific devices and processes illustrated in the attached drawings and described in the specification are simply exemplary embodiments or aspects of the invention. Although the invention has been described in detail for the purpose of illustration based on what is currently considered to be the most practical and preferred embodiments or aspects, it is to be understood that such detail is solely for that purpose and that the invention is not limited to the disclosed embodiments or aspects, but, on the contrary, is intended to cover modifications and equivalent arrangements that are within the spirit and scope thereof. For example, it is to be understood that the present invention contemplates that, to the extent possible, one or more features of any embodiment or aspect can be combined with one or more features of any other embodiment or aspect.

The invention claimed is:

1. A joint fitting for an electrical conduit raceway, comprising:
   a body having at least one open side and defining a central passageway therein;
   at least one lid configured to be disposed on the body to close the at least one open side of the body;
   at least one fastener configured to connect the at least one lid to the body;
   at least one gasket disposed between the at least one lid and the body, the gasket being configured to seal a connection between the lid and the body,
   wherein the at least one lid comprises at least one aperture formed therein for receiving the at least one fastener therein to allow the fastener to extend through the lid and the at least one gasket comprises at least one cylindrical projection configured to extend into the aperture in the lid and receive the at least one fastener therein such that the cylindrical projection is in direct contact with the at least one fastener to retain the at least one fastener to the lid.

2. The joint fitting according to claim 1, wherein the body defines a rim surrounding the at least one open side and the gasket is configured to be seated on the rim over an entirety or a substantial entirety of the rim.

3. The joint fitting according to claim 1, wherein:
   the at least one fastener configured to connect the lid to the body comprises at least two fasteners;
   the lid comprises at least two apertures formed therein for receiving the at least two fasteners to allow the fasteners to extend through the lid; and
   the gasket comprises at least two cylindrical projections configured to extend into a respective one of the two apertures in the lid and receive a respective one of the at least two fasteners there to retain the respective fastener to the lid.

4. The joint fitting according to claim 1, wherein the at least one gasket has a flat shape and at least one slot defined therein.

5. The joint fitting according to claim 1, wherein the body and the at least one lid are formed from a stainless steel material.

6. The joint fitting according to claim 1, wherein the at least one lid and the body comprise exterior surfaces that are free or substantially free of edges, crevasses, and flat surfaces.

7. The joint fitting according to claim 1, wherein the body has a bowed configuration.

8. The joint fitting according to claim 1, wherein the at least one lid has a raised configuration.

9. The joint fitting according to claim 1, further comprising at least one sealing member disposed between the at least one fastener and the at least one lid, wherein the at least one fastener comprises at least one stop configured to optimize compression of the at least one sealing member.

10. A joint fitting for an electrical conduit raceway, comprising:
   a body having at least one open side and defining a central passageway therein;
   at least one lid configured to be disposed on the body to close the at least one open side of the body; and
   at least one gasket disposed between the at least one lid and the body, the gasket being configured to seal a connection between the lid and the body,
   wherein the at least one gasket has a flat shape and at least two slots defined therein to limit or eliminate contamination areas within the joint fitting.

11. The joint fitting according to claim 10, wherein the at least one lid comprises at least one aperture formed therein for receiving at least one fastener therein to allow the fastener to extend through the lid and the at least one gasket comprises at least one cylindrical projection configured to extend into the aperture in the lid and receive the at least one fastener therein to retain the at least one fastener to the lid.

12. The joint fitting according to claim 10, wherein the body defines a rim surrounding the at least one open side and the gasket is configured to be seated on the rim over an entirety or a substantial entirety of the rim.

13. The joint fitting according to claim 10, further comprising:
   at least two fasteners configured to connect the lid to the body, wherein:
   the lid comprises at least two apertures formed therein for receiving the at least two fasteners to allow the fasteners to extend through the lid; and
   the gasket comprises at least two cylindrical projections configured to extend into a respective one of the two apertures in the lid and receive a respective one of the at least two fasteners there to retain the respective fastener to the lid.

14. The joint fitting according to claim 10, wherein the body and the at least one lid are formed from a stainless steel material.

15. The joint fitting according to claim 10, wherein the at least one lid and the body comprise exterior surfaces that are free or substantially free of edges, crevasses, and flat surfaces.

16. The joint fitting according to claim 10, wherein the body has a bowed configuration.

17. The joint fitting according to claim 10, wherein the at least one lid has a raised configuration.

18. The joint fitting according to claim 10, further comprising at least one sealing member disposed between the at least one fastener and the at least one lid, wherein the at least one fastener comprises at least one stop configured to optimize compression of the at least one sealing member.

* * * * *